(12) United States Patent
Bae et al.

(10) Patent No.: US 10,748,463 B2
(45) Date of Patent: Aug. 18, 2020

(54) SYSTEM ARCHITECTURE AND METHOD OF PROCESSING AN IMAGE THEREIN

(71) Applicant: Purdue Research Foundation, West Lafayette, IN (US)

(72) Inventors: Euiwon Bae, West Lafayette, IN (US); Huisung Kim, Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 70 days.

(21) Appl. No.: 16/175,752

(22) Filed: Oct. 30, 2018

(65) Prior Publication Data

US 2019/0130805 A1 May 2, 2019

Related U.S. Application Data

(60) Provisional application No. 62/578,625, filed on Oct. 30, 2017.

(51) Int. Cl.
| | |
|---|---|
| *G09G 3/00* | (2006.01) |
| *G06T 5/20* | (2006.01) |
| *G09G 5/02* | (2006.01) |
| *G06T 5/00* | (2006.01) |
| *G06T 5/50* | (2006.01) |

(52) U.S. Cl.
CPC ............. *G09G 3/007* (2013.01); *G06T 5/002* (2013.01); *G06T 5/20* (2013.01); *G06T 5/50* (2013.01); *G09G 5/028* (2013.01); *G06T 2207/10016* (2013.01); *G06T 2207/10024* (2013.01); *G06T 2207/20182* (2013.01); *G06T 2207/30072* (2013.01)

(58) Field of Classification Search
CPC ........ G09G 3/007; G09G 5/028; G06T 5/002; G06T 5/20; G06T 5/50
See application file for complete search history.

(56) References Cited

U.S. PATENT DOCUMENTS

| | | | |
|---|---|---|---|
| 2003/0012439 A1* | 1/2003 | Lawton .................. | G06K 9/325 |
| | | | 382/173 |
| 2012/0081577 A1* | 4/2012 | Cote ...................... | H04N 19/80 |
| | | | 348/231.99 |

(Continued)

*Primary Examiner* — Md K Talukder
(74) *Attorney, Agent, or Firm* — Purdue Research Foundation

(57) ABSTRACT

A non-transitory computer-readable medium encoded with a computer-readable program, which when executed by a processor, will cause the processor to execute an image processing method, the image processing method including establishing a zero crossing region from a target image onto a screen, wherein the zero crossing region comprises a corresponding value. The method further includes receiving a variable input and an integration time input, wherein the variable input comprises a frequency number for an image accumulation procedure, and wherein the integration time comprises a time period for which an aperture for a sensor receives incoming signals. Additionally, the method includes performing the image accumulation procedure. Moreover, the method includes producing a final greyscale image by adding a plurality of sets of vertically shifted pixel values, wherein the frequency number for the image accumulation procedure ranges from 3 to 20.

20 Claims, 8 Drawing Sheets

(56) References Cited

U.S. PATENT DOCUMENTS

| | | | |
|---|---|---|---|
| 2014/0267653 A1* | 9/2014 | Richardson | G06T 5/003 |
| | | | 348/65 |
| 2015/0172669 A1* | 6/2015 | Nishiyama | H04N 19/136 |
| | | | 375/240.08 |
| 2015/0324390 A1* | 11/2015 | Macciola | G06F 16/583 |
| | | | 707/769 |
| 2017/0083762 A1* | 3/2017 | Segalovitz | G06K 9/4628 |
| 2019/0130805 A1* | 5/2019 | Bae | G09G 3/007 |
| 2020/0053378 A1* | 2/2020 | Wang | G06T 5/002 |
| 2020/0069271 A1* | 3/2020 | Maalej | G06T 5/50 |

* cited by examiner

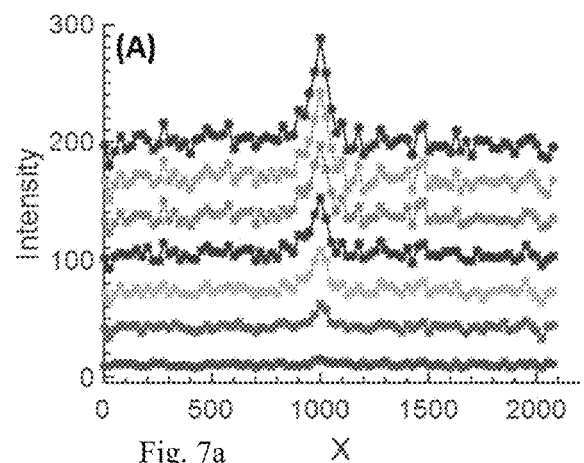
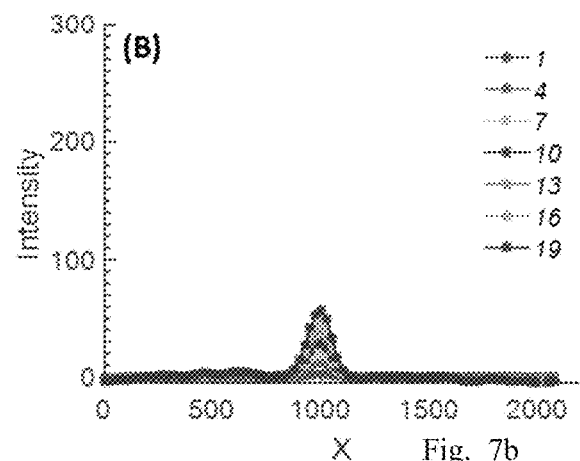
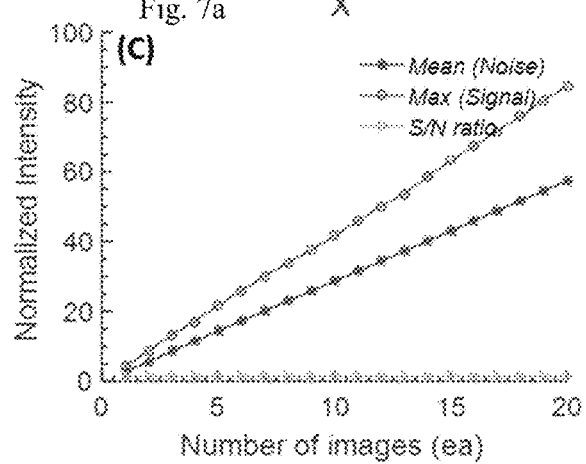
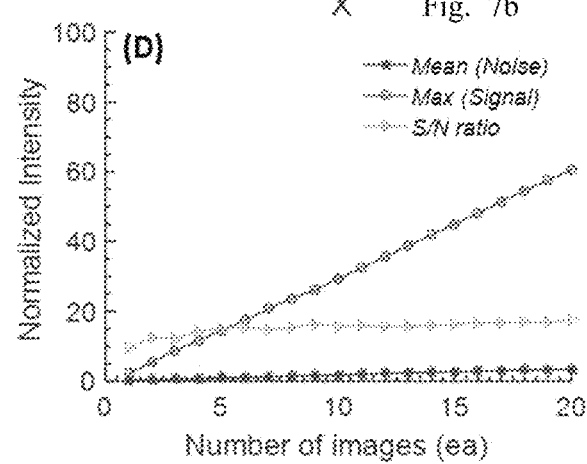
Figure 7

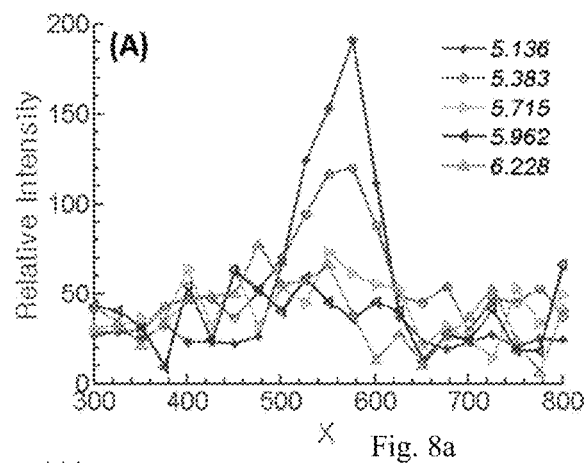 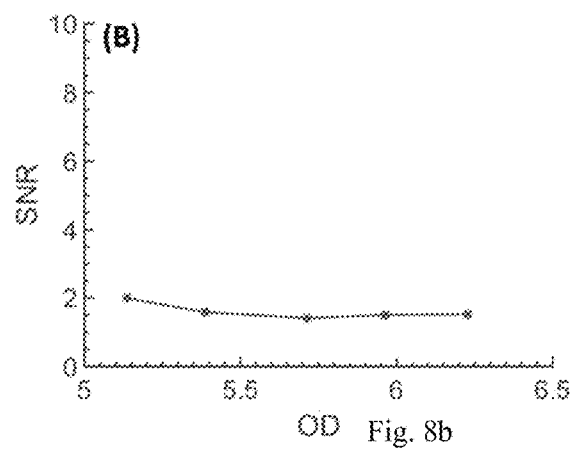
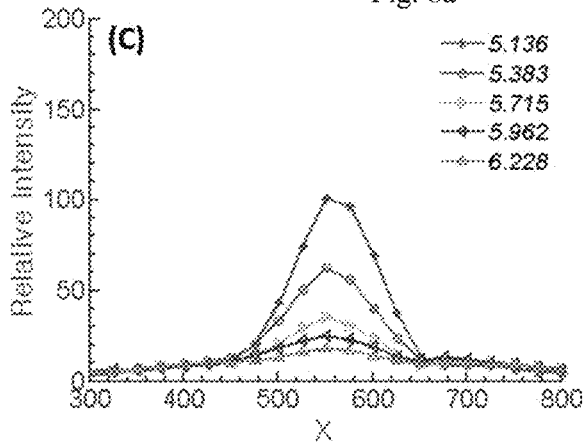 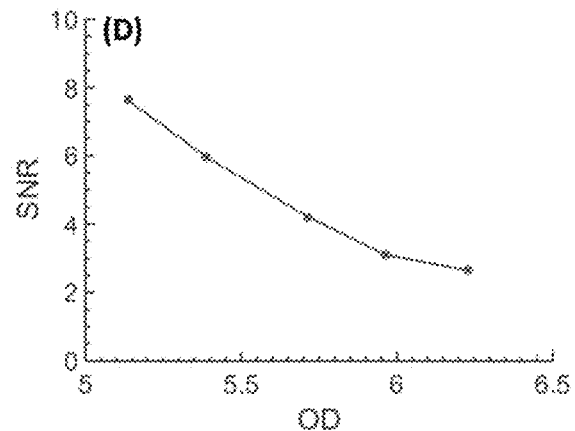
Figure 8

SYSTEM ARCHITECTURE AND METHOD OF PROCESSING AN IMAGE THEREIN

CROSS-REFERENCE TO RELATED APPLICATIONS

The present U.S. Patent Application is related to and claims the priority benefit of U.S. Provisional Patent Application Ser. No. 62/578,625, filed Oct. 30, 2017, the contents of which is hereby incorporated by reference in its entirety into this disclosure.

STATEMENT OF GOVERNMENT SUPPORT

This invention was made with government support under 59-8072-6-001 awarded by the USDA. The government has certain rights in the invention.

BACKGROUND

This section introduces aspects that may help facilitate a better understanding of the disclosure. Accordingly, these statements are to be read in this light and are not to be understood as admissions about what is or is not prior art.

Luminescence based detection methods have been used in biology, chemistry, and the medical field due to their unique characteristic of self-photon generation from chemical/biological energy. Among these methods, bioluminescence is extremely attractive as the genetics and biochemistry are known for many luminescent organisms. The genes from these systems can be cloned and expressed in bacteria. The expression of these genes can also be integrated with genetic regulatory elements to sense physical and chemical changes in the bacteria's environment and produce a luminescent response. These luminescent reporter bacteria can be interfaced with optical transducers resulting in biosensors for numerous monitoring applications as well as reagents. The recent trends of integrating everything into network connectivity such as the internet of things (IoT) have drawn interest from numerous areas of research.

For the purposes of detection, the mathematical description of conventional noise-cancellation algorithm is not effective when an input signal is close to noise levels. In order to detect luminescence when the input signal is close to noise levels, there is a need for innovative enclosures, along with innovative noise-cancellation algorithms.

SUMMARY

The smartphone has become a versatile platform with tremendous potential for scientific instrumentation. Owing to their inherent nature, smartphones have 1) high computing power, 2) high-resolution complementary metal-oxide semiconductor (CMOS) sensors, and 3) network and geotagging capability. In addition, compared to other laboratory equipment, smartphones are inexpensive and can be easily converted to portable instruments with appropriate accessories. Various embodiments of the present application relate to an integrated luminescence readout system comprising of a simple, portable, and low-cost sample enclosure with associated algorithms that effectively translate luminescence intensity to concentration for a sample. In one or more embodiments, the enclosure provides a light-tight environment and positions the sample at the same location.

A non-transitory computer-readable medium encoded with a computer-readable program, which when executed by a processor, will cause the processor to execute an image processing method, the image processing method including establishing a zero crossing region from a target image onto a screen, wherein the zero crossing region includes a corresponding value. The method includes receiving a variable input and an integration time input, wherein the variable input includes a frequency number for an image accumulation procedure, and wherein the integration time includes a time period for which an aperture for a sensor receives incoming signals. Additionally, the method includes performing the image accumulation procedure, wherein the image accumulation procedure includes: performing an accumulation of a plurality of incoming signals captured by the sensor within the integration time. The image accumulation procedure further includes obtaining an RGB image from the accumulation of the plurality of incoming signals captured by the sensor within the integration time. Additionally, the image accumulation procedure includes converting the RGB image into a greyscale image. The image accumulation procedure includes applying a circular averaging filter to the greyscale image. Moreover, the image accumulation procedure includes performing a vertical translation using the corresponding value on the greyscale image, thereby producing a vertically translated greyscale image. Further, the image accumulation procedure includes calculating a set of vertically shifted pixel values from the vertically translated greyscale image and the corresponding value. The method additionally includes producing a final greyscale image by adding a plurality of sets of vertically shifted pixel values, wherein the frequency number for the image accumulation procedure ranges from 3 to 20.

A non-transitory computer-readable medium encoded with a computer-readable program, which when executed by a processor, will cause the processor to execute an image processing method, the image processing method including establishing a zero crossing region from a target image onto a screen, wherein the zero crossing region includes a corresponding value. The method includes receiving a variable input and an integration time input, wherein the variable input includes a frequency number for an image accumulation procedure. Additionally, the method includes performing the image accumulation procedure, wherein the image accumulation procedure includes: performing an accumulation of a plurality of incoming signals captured by the sensor within the integration time. The image accumulation procedure further includes obtaining an RGB image from the accumulation of the plurality of incoming signals captured by the sensor within the integration time. Additionally, the image accumulation procedure includes converting the RGB image into a greyscale image. The image accumulation procedure includes applying a circular averaging filter to the greyscale image. Moreover, the image accumulation procedure includes performing a vertical translation using the corresponding value on the greyscale image, thereby producing a vertically translated greyscale image. Further, the image accumulation procedure includes calculating a set of vertically shifted pixel values from the vertically translated greyscale image and the corresponding value. The method additionally includes producing a final greyscale image by adding a plurality of sets of vertically shifted pixel values, wherein the frequency number for the image accumulation procedure ranges from 3 to 20.

A non-transitory computer-readable medium encoded with a computer-readable program, which when executed by a processor, will cause the processor to execute an image processing method, the image processing method including establishing a zero crossing region from a target image onto a screen, wherein the zero crossing region includes a corresponding value. The method includes receiving a variable input and an integration time input, wherein the variable input includes a frequency number for an image accumulation procedure. Additionally, the method includes performing the image accumulation procedure, wherein the image accumulation procedure includes: performing an accumulation of a plurality of incoming signals captured by the sensor within the integration time. The image accumulation procedure further includes obtaining an RGB image from the accumulation of the plurality of incoming signals captured by the sensor within the integration time. Additionally, the image accumulation procedure includes converting the RGB image into a greyscale image. The image accumulation procedure includes applying a circular averaging filter to the greyscale image. Moreover, the image accumulation procedure includes performing a vertical translation using the corresponding value on the greyscale image, thereby producing a vertically translated greyscale image. Further, the image accumulation procedure includes calculating a set of vertically shifted pixel values from the vertically translated greyscale image and the corresponding value. The method additionally includes producing a final greyscale image by adding a plurality of sets of vertically shifted pixel values.

BRIEF DESCRIPTION OF THE DRAWINGS

One or more embodiments are illustrated by way of example, and not by limitation, in the figures of the accompanying drawings, wherein elements having the same reference numeral designations represent like elements throughout. It is emphasized that, in accordance with standard practice in the industry, various features may not be drawn to scale and are used for illustration purposes only. In fact, the dimensions of the various features in the drawings may be arbitrarily increased or reduced for clarity of discussion.

FIG. 7 includes FIG. 7a, FIG. 7b, FIG. 7c, and FIG. 7d. FIG. 7a illustrates a graph of intensity of incoming photons vs a number of pixels when no noise-cancellation algorithm is applied. FIG. 7b illustrates a graph of intensity of incoming photons vs a number of pixels when a noise-cancellation algorithm is applied. FIG. 7c illustrates a graph of normalized intensity of incoming photons vs a number of images when no noise-cancellation algorithm is applied. FIG. 7d illustrates a graph of normalized intensity of incoming photons vs a number of images when the noise-cancellation algorithm is applied.

FIG. 8 includes FIG. 8a, FIG. 8b, FIG. 8c, and FIG. 8d. FIG. 8a illustrates a graph of relative intensity vs a number of pixels at various optical density (OD) filters when no noise-cancellation algorithm is applied. FIG. 8b illustrates a graph of signal-to-noise ratio vs OD filters when no noise-cancellation algorithm is applied. FIG. 8c illustrates a graph of relative intensity vs a number of pixels at various optical density (OD) filters when a noise-cancellation algorithm is applied.

FIG. 8d illustrates a graph of signal-to-noise ratio vs OD filters when the noise-cancellation algorithm is applied.

DETAILED DESCRIPTION

The following disclosure provides many different embodiments, or examples, for implementing different features of the present application. Specific examples of components and arrangements are described below to simplify the present disclosure. These are examples and are not intended to be limiting. The making and using of illustrative embodiments are discussed in detail below. It should be appreciated, however, that the disclosure provides many applicable concepts that can be embodied in a wide variety of specific contexts. In at least some embodiments, one or more embodiment(s) detailed herein and/or variations thereof are combinable with one or more embodiment(s) herein and/or variations thereof.

Various embodiments of the present disclosure relates to a system which includes a computing device coupled to a sensor, a slot for the computing device which is coupled to the sensor, an enclosure, and a non-transitory computer-readable medium encoded with a computer-readable image processing program. In at least one embodiment, the computing device coupled to a sensor is a smartphone. In one or more embodiments, the computer-readable image processing program increases signal to noise ratio of images in an environment where an input level of a signal from the sensor is close to a noise level of the environment.

Figure 1:
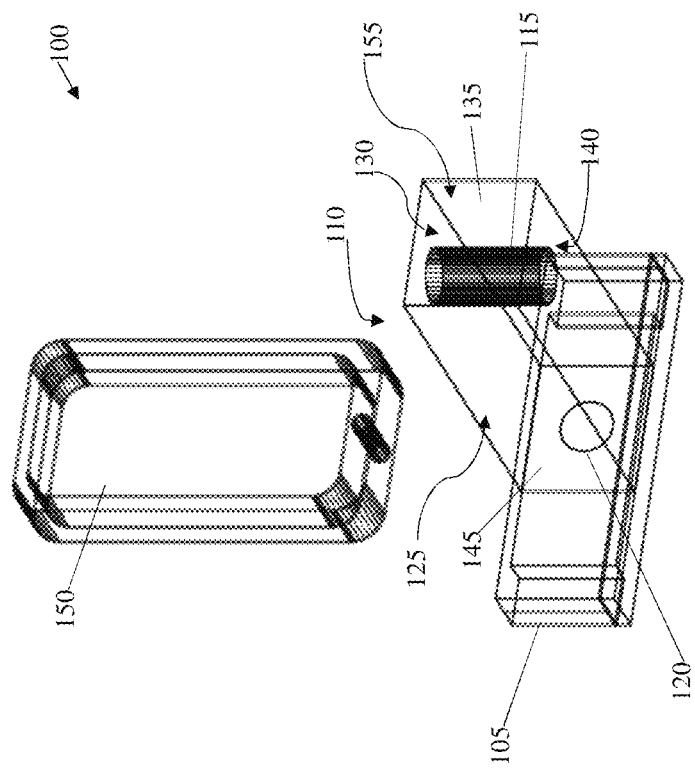
FIG. 1 illustrates a system 100 according to one or more embodiments.

FIG. 1 illustrates a system 100 according to one or more embodiments. System 100 includes a smartphone 150, a slot 105, and an enclosure 110. Smartphone 150 fits into slot 105 such that a camera from smartphone 150 is exposed through a first opening 120 of enclosure 110.

Enclosure 110 includes first opening 120, a second opening 115, a first sidewall 145, a second sidewall 125, a third sidewall 140, a fourth sidewall 135, a fifth sidewall 130, and a sixth sidewall 155. In at least one embodiment, a diameter of second opening 115 is less than 18 millimeters (mm). In some embodiments, a diameter of second opening 115 is approximately 18 millimeters (mm). In some embodiments, a diameter of second opening 115 is less than 19 millimeters (mm). In one or more embodiments, a vertical distance from fifth sidewall 130 to third sidewall 140 is approximately 35 mm. In some embodiments, a horizontal distance from first opening 120 of first sidewall 145 to a point within second opening 115 is approximately 50 mm. In some embodiments, the camera from smartphone 150 has a camera lens with a focal specification of 25 mm.

In at least one embodiment, inner regions of at least one of first sidewall 145, second sidewall 125, third sidewall 140, fourth sidewall 135, fifth sidewall 130, or sixth sidewall 155 are coated with a reflective film. The reflective film includes at least one of polyester (PET), UV-PET, polycarbonate, PMMA (Acrylic), or polycarbonate. Second opening 115 is configured to receive a test-tube. The test-tube has a diameter of 10 mm, 12 mm, 13 mm, 16 mm, 6 mm, 15 mm, or 18 mm. In an optional embodiment, second opening 115 includes a first cap and a second cap. The first cap is configured to cover a top portion of second opening 115 and the second cap is configured to cover a bottom portion of second opening 115.

Figure 2:
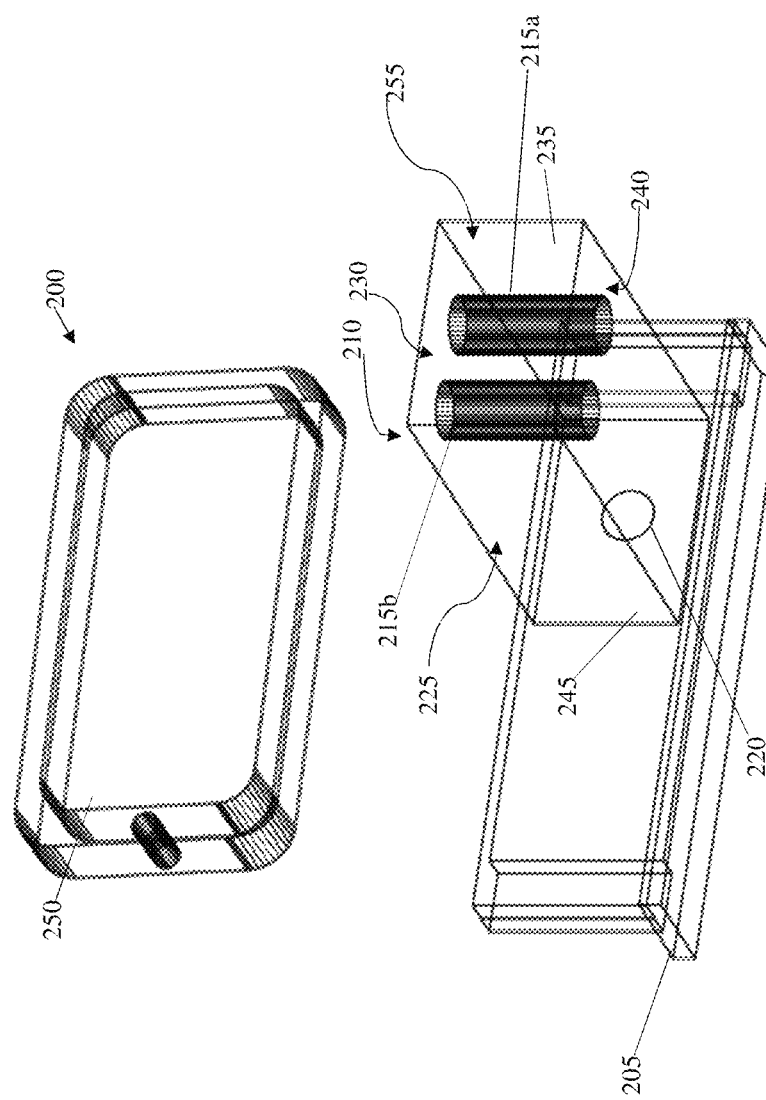
FIG. 2 illustrates a system 200 according to one or more embodiments.

FIG. 2 illustrates a system 200 according to one or more embodiments. System 200 includes a smartphone 250, a slot 205, and an enclosure 210. Smartphone 250 fits into slot 205 such that a camera from smartphone 250 is exposed through a first opening 220 of enclosure 210.

Enclosure 210 includes first opening 220, second openings 215a and 215b, a first sidewall 245, a second sidewall 225, a third sidewall 240, a fourth sidewall 235, a fifth sidewall 230, and a sixth sidewall 255. In at least one embodiment, a diameter of each of the second openings 215a and 215b is less than 18 millimeters (mm). In some embodiments, a diameter of each of the second openings 215a and 215b is approximately 18 millimeters (mm). In some embodiments, a diameter of each of the second openings 215a and 215b is less than 19 millimeters (mm). In one or more embodiments, a vertical distance from fifth sidewall 230 to third sidewall 240 is approximately 35 mm. In some embodiments, a horizontal distance from first opening 220 of first sidewall 245 to a point within the each of the second openings 215a and 215b is approximately 50 mm. In some embodiments, the camera from smartphone 250 has a camera lens with a focal specification of 25 mm.

In at least one embodiment, inner regions of at least one of first sidewall 245, second sidewall 225, third sidewall 240, fourth sidewall 235, fifth sidewall 230, or sixth sidewall 255 are coated with a reflective film. The reflective film includes at least one of polyester (PET), UV-PET, polycarbonate, PMMA (Acrylic), 4- to 6-λ first-surface mirror (specular reflection), ABS material (default), or polycarbonate. Second opening 215 is configured to receive a test-tube. The test-tube has a diameter of 10 mm, 12 mm, 13 mm, 16 mm, 6 mm, 15 mm, or 18 mm. In an optional embodiment, second opening 215 includes a first cap and a second cap. The first cap is configured to cover a top portion of second opening 215 and the second cap is configured to cover a bottom portion of second opening 215.

Figure 3:
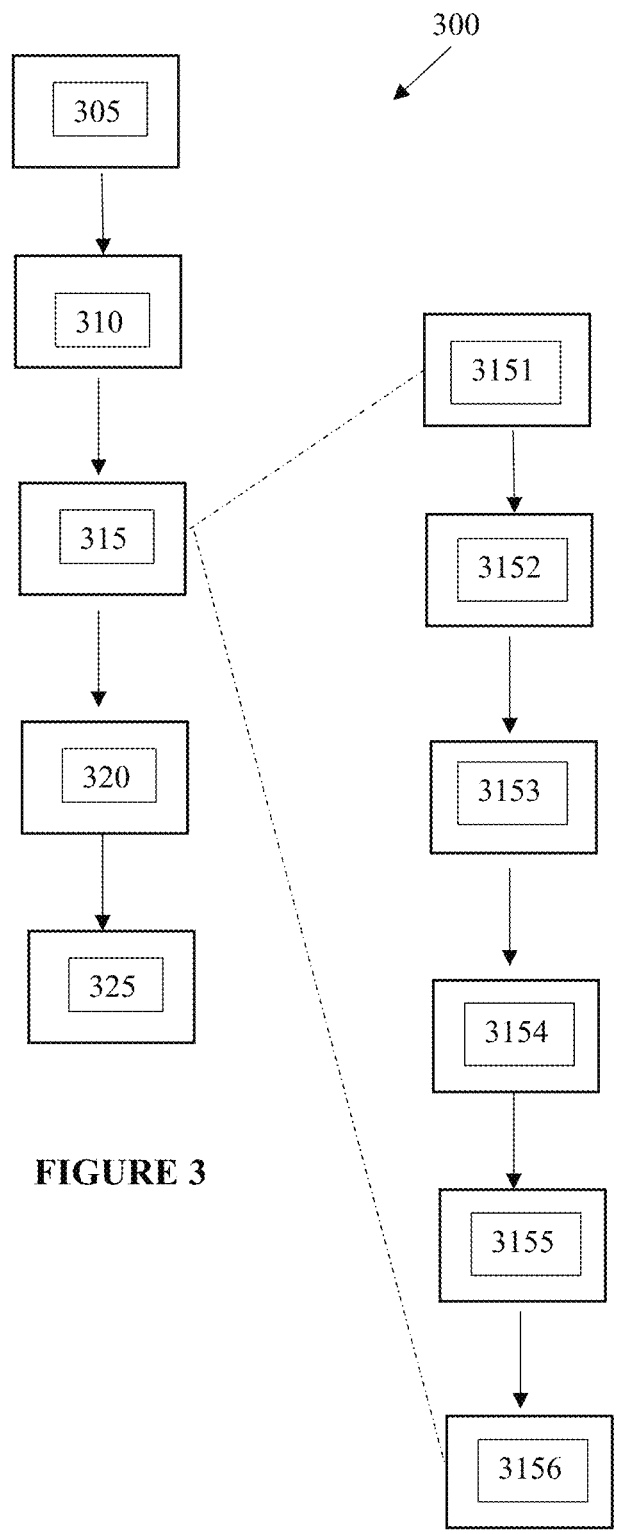
FIG. 3 illustrates a flow-chart which illustrates a method of processing an image according to one or more embodiments.

FIG. 3 is a flow-chart which illustrates a method 300 of processing an image according to one or more embodiments. Method 300 of processing an image starts off with step 305 where a zero crossing region from a target image is established onto a screen. In at least one embodiment, the zero crossing region comprises a corresponding value. The corresponding value is a pixel value of background noise level associated with the target image. Method 300 proceeds with step 310 where a variable input and an integration time input is received from a user. In at least one embodiment, the variable input is a frequency number for image accumulation and the integration time is a time period for which an aperture for a sensor receives incoming signals. In some embodiments, the sensor is a camera of a smartphone. In one or more embodiments, at least one of the variable input or the integration time input is user defined.

Method 300 proceeds with procedure 315 where a procedure of image accumulation commences. The procedure of image accumulation includes step 3151 where an accumulation of a concurrent plurality of incoming signals captured by the sensor is performed within the integration time. Procedure 315 proceeds with step 3152 where a first Red-Green-Blue (RGB) image is obtained from the accumulation of the plurality of incoming signals captured by the sensor within the integration time. Procedure 315 additionally proceeds with step 3153 where the first RGB image is converted into a first greyscale image. Procedure 315 further proceeds with step 3154 where a circular averaging filter is applied to the first greyscale image. Moreover, procedure 315 includes step 3155 where a first vertical translation on the first greyscale image is performed using the corresponding value, thereby producing a first vertically translated greyscale image. Additionally, procedure 315 includes step 3156 where a first set of vertically shifted pixel values is calculated from the first vertically translated greyscale image and the corresponding value. In at least one embodiment, the frequency number for procedure 315 ranges from 3 to 20. In some embodiments, the frequency number for procedure 315 is 3.

After satisfying the frequency number, method 300 continues with step 320 where a final greyscale image is produced by adding the first set of vertically shifted pixel values, the second set of vertically shifted pixel values, and the third set of vertically shifted pixel values. Method 300 additionally continues with step 325 where the final greyscale image is outputted onto the screen.

In various embodiments of method 300, the zero crossing region is established by a user. In at least one embodiment, the integration time is in seconds. In some embodiments, the integration time ranges from approximately 0.1 seconds to 60 seconds. In one or more embodiments, the screen is a capacitive screen. According to at least one embodiment of method 300, the target image includes at least one of a luminescent image, a Raman signal image, a bio-luminescent image, a chem-luminescent image, or a fluorescent image.

One of ordinary skill in the art would recognize that operations are added or removed from method 300, in one or more embodiments. One of ordinary skill in the art would also recognize that the order of the operations in method 300 is varied in various alternative embodiments.

In one or more embodiments, method 300 is performed by a system architecture. The system architecture includes a first protocol, wherein the first protocol is configured to establish a zero crossing region from a target image onto a screen. In at least one embodiment, the zero crossing region comprises a corresponding value. The corresponding value is a pixel value of background noise level associated with the target image. The system architecture includes a second protocol, wherein the second protocol is configured to receive a variable input and an integration time input from a user. In at least one embodiment, the variable input is a frequency number for image accumulation and the integration time is a time period for which an aperture for a sensor receives incoming signals. In some embodiments, the sensor is a camera of a smartphone. In one or more embodiments, at least one of the variable input or the integration time input is user defined.

The system architecture additionally includes an image accumulation protocol where a procedure of image accumulation commences. The image accumulation protocol includes a first sub-protocol, wherein the first sub-protocol is configured to perform an accumulation of a concurrent plurality of incoming signals captured by the sensor is performed within the integration time. The image accumulation protocol includes a second sub-protocol, wherein the second sub-protocol is configured to obtain a first Red-Green-Blue (RGB) image from the accumulation of the plurality of incoming signals captured by the sensor within the integration time. The image accumulation protocol additionally includes a third sub-protocol, wherein the third sub-protocol is configured to convert the first RGB image into a first greyscale image. The image accumulation protocol further includes a fourth sub-protocol, wherein the fourth sub-protocol is configured to apply a circular averaging filter to the first greyscale image. Moreover, the image accumulation protocol includes a fifth sub-protocol, wherein the fifth sub-protocol is configured to perform a first vertical translation on the first greyscale image using the corresponding value, thereby producing a first vertically translated greyscale image. Additionally, the image accumulation protocol includes a sixth protocol, wherein the sixth protocol is configured to calculate a first set of vertically shifted pixel values from the first vertically translated greyscale image and the corresponding value. In at least one embodiment, the frequency number for running the image accumulation protocol ranges from 3 to 20. In some embodiments, the frequency number for running the image accumulation protocol is 3.

The system architecture additionally includes a third protocol, wherein the third protocol is configured to produce a final greyscale image by adding the first set of vertically shifted pixel values, the second set of vertically shifted pixel values, and the third set of vertically shifted pixel values. The system architecture includes a fourth protocol, wherein the fourth protocol is configured to output the final greyscale image onto the screen. In various embodiments of the system architecture, the zero crossing region is established by a user. In at least one embodiment, the integration time is in seconds. In some embodiments, the integration time ranges from approximately 0.1 seconds to 60 seconds. In one or more embodiments, the screen is a capacitive screen. According to at least one embodiment of method 300, the target image includes at least one of a luminescent image, a Raman signal image, a bio-luminescent image, a chem-luminescent image, or a fluorescent image.

Figure 4:
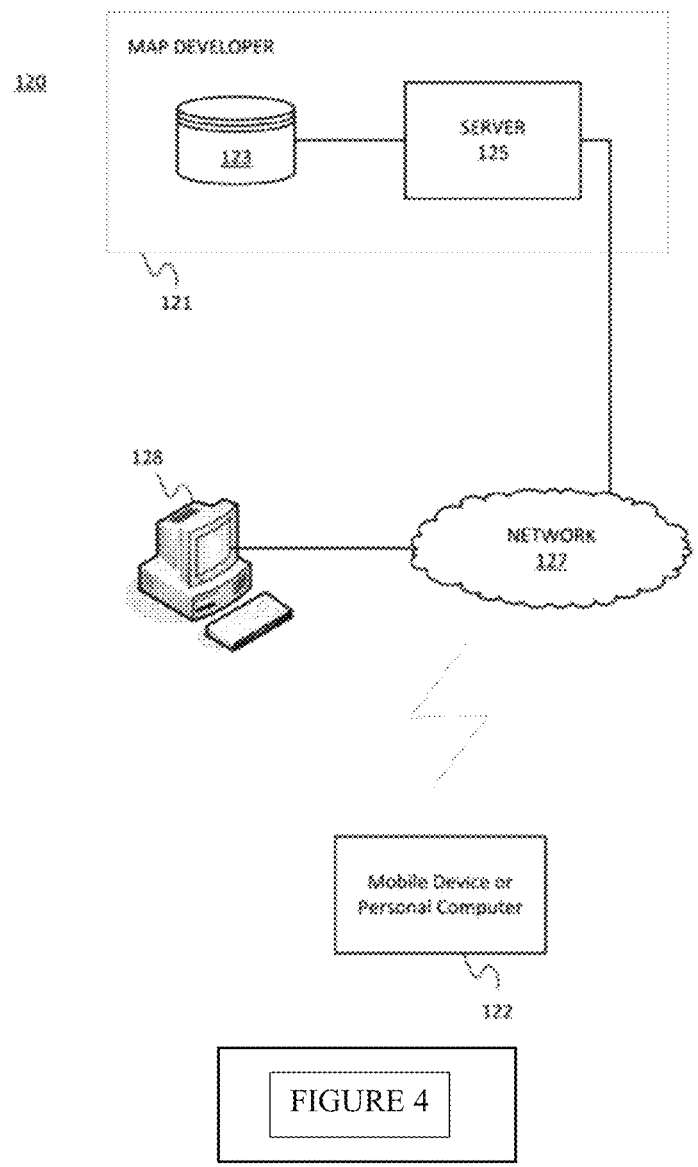
FIG. 4 illustrates an exemplary server of the system that performs method 300 in FIG. 3.

Method 300 may be performed by a mobile device, personal computer, or workstation and controller and/or server and processor. FIG. 4 illustrates one embodiment of an image processing system 120. The system 120 may include a map developer system 121, a mobile device or personal computer 122, a workstation 128, and a network 127. Additional, different, or fewer components may be provided.

The mobile device or personal computer 122 may be a smart phone, a mobile phone, a personal digital assistant ("PDA"), a tablet computer, a notebook computer, a desktop computer, a personal navigation device ("PND"), a portable navigation device, and/or any other known or later developed mobile device or personal computer.

The developer system 121 includes a server 125 and a database 123. The developer system 121 may include computer systems and networks of a system operator such as HERE, NAVTEQ, or Nokia Corporation. The database 123 is configured to store images provided from a camera, as well as reconstructed images processed by the server and algorithm. The server 125 is configured to receive the plurality of images from the camera and analyze/process the images to form a refined image. The server 125 may also be configured to store the 3D model and/or the improved image generated in the process.

The developer system 121, the workstation 128, and the mobile device or personal computer 122 are coupled with the network 127. The phrase "coupled with" is defined to mean directly connected to or indirectly connected through one or more intermediate components. Such intermediate components may include hardware and/or software-based components.

The workstation 128 may be a general purpose computer including programming specialized for providing input to the server 125. For example, the workstation 128 may provide settings for the server 125. The settings may include a value for the predetermined interval that the server 125 requests mobile device 122 to relay current geographic locations. The workstation 128 may be used to enter data indicative of GPS accuracy to the database 123. The workstation 128 may include at least a memory, a processor, and a communication interface.

Figure 5:
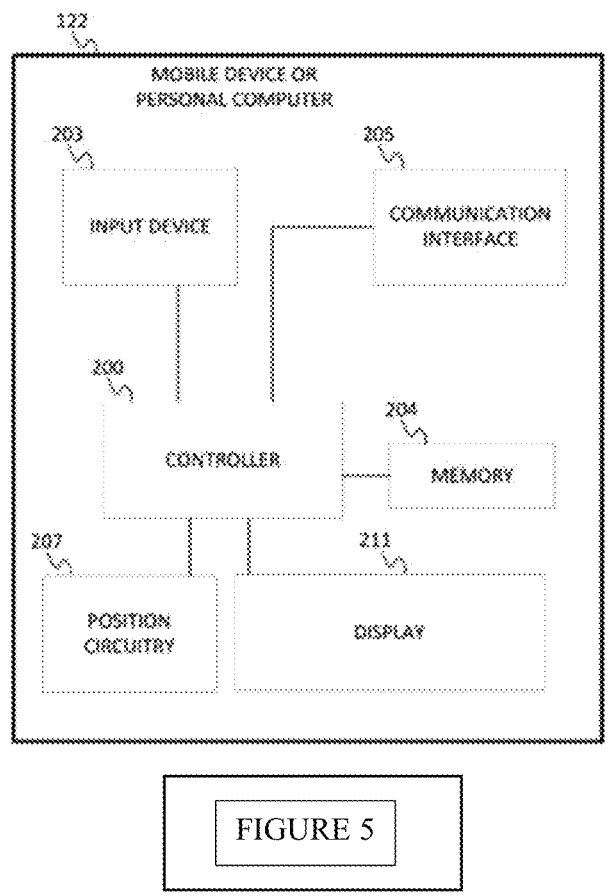
FIG. 5 illustrates an exemplary mobile device of FIG. 4.

FIG. 5 illustrates an exemplary mobile device or personal computer 122 of the system of FIG. 4. The mobile device or personal computer 122 includes a controller 200, a memory 204, an input device 203, a communication interface 205, position circuitry 207, and a display 211. Additional, different, or fewer components are possible for the mobile device/personal computer 122.

The controller 200 may be configured to receive data indicative of the location of the mobile device or personal computer 122 from the position circuitry 207. The positioning circuitry 207, which is an example of a positioning system, is configured to determine a geographic position of the mobile device or personal computer 122. The positioning system may also include a receiver and correlation chip to obtain a GPS signal. The positioning circuitry may include an identifier of a model of the positioning circuitry 207. The controller 200 may access the identifier and query a database or a website to retrieve the accuracy of the positioning circuitry 207 based on the identifier. The positioning circuitry 207 may include a memory or setting indicative of the accuracy of the positioning circuitry.

Figure 6:
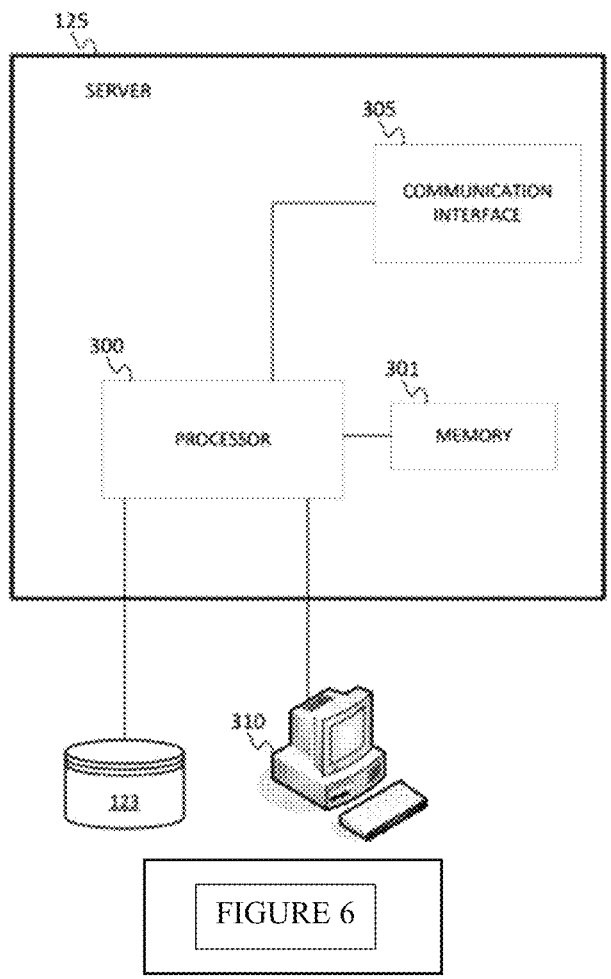
FIG. 6 illustrates an exemplary mobile device of FIG. 4.

FIG. 6 illustrates an exemplary server 125 of the image processing system of FIG. 4. The server 125 includes a processor 300, a communication interface 305, and a memory 301. The server 125 may be coupled to a database 123 and a workstation 128. The workstation 128 may be used as an input device for the server 125. In addition, the communication interface 305 is an input device for the server 125. The communication interface 305 receives data indicative of use inputs made via the workstation 128 or the mobile device or personal computer 122.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The controller 200 and/or processor 300 may also be configured to cause an apparatus to at least perform at least one of the image processing methods described above. The memory 204 and/or memory 301 may be a volatile memory or a non-volatile memory.

The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

In the above described embodiments, the network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

While the non-transitory computer-readable medium is described to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term "circuitry" or "circuit" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., E PROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

FIG. 7(a) illustrates a graph of intensity of incoming photons vs a number of pixels when no noise-cancellation algorithm is applied. FIG. 7(b) illustrates a graph of intensity of incoming photons vs a number of pixels when a noise-cancellation algorithm is applied. FIG. 7(c) illustrates a graph of normalized intensity of incoming photons vs a number of images when no noise-cancellation algorithm is applied. FIG. 7(d) illustrates a graph of normalized intensity of incoming photons vs a number of images when the noise-cancellation algorithm is applied.

FIG. 8(a) illustrates a graph of relative intensity vs a number of pixels at various optical density (OD) filters when no noise-cancellation algorithm is applied. FIG. 8(b) illustrates a graph of signal-to-noise ratio vs OD filters when no noise-cancellation algorithm is applied. FIG. 8(c) illustrates a graph of relative intensity vs a number of pixels at various optical density (OD) filters when a noise-cancellation algorithm is applied. FIG. 8(d) illustrates a graph of signal-to-noise ratio vs OD filters when the noise-cancellation algorithm is applied.

FIGS. 7a-d illustrate the effect of an image processing algorithm for low light detection. For the comparison, a simple accumulation algorithm was applied to the series of low-light images and their SNRs were plotted (FIG. 7c). Performance did not improve since both noise and signal were accumulated. Meanwhile, the image processing algorithm effectively reduced the noise while preserving the desired signal. Therefore, SNR increased up to integrating five or more images at a given filter OD and plateau after that (FIG. 7d). For a more detailed analysis, five intermediate OD values were measured between OD5.136 and OD6.228. FIG. 8a-b illustrates the 1-D cross-sectional intensity profile for the simple accumulation algorithm; the associated SNR illustrates a plateau below OD5.718 where the signal and the noise becomes indistinguishable. Meanwhile, when the image processing algorithm was applied, the absolute value of the maximum intensity is lower than the simple accumulation algorithm; the significant reduction of the inherent noise level improves the overall SNR up to four times that of the simple accumulation algorithm (FIG. 8c-d).

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, design, machine, manufacture, and composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

The invention claimed is:

1. A non-transitory computer-readable medium encoded with a computer-readable program, which when executed by a processor, will cause the processor to execute an image processing method, the image processing method comprising:
 establishing a zero crossing region from a target image onto a screen, wherein the zero crossing region comprises a corresponding value;
 receiving a variable input and an integration time input, wherein the variable input comprises a frequency number for an image accumulation procedure, and wherein the integration time comprises a time period for which an aperture for a sensor receives incoming signals;
 performing the image accumulation procedure, wherein the image accumulation procedure comprises:
  performing an accumulation of a plurality of incoming signals captured by the sensor within the integration time;
  obtaining an RGB image from the accumulation of the plurality of incoming signals captured by the sensor within the integration time;
  converting the RGB image into a greyscale image;
  applying a circular averaging filter to the greyscale image;

performing a vertical translation using the corresponding value on the greyscale image, thereby producing a vertically translated greyscale image; and calculating a set of vertically shifted pixel values from the vertically translated greyscale image and the corresponding value; and producing a final greyscale image by adding a plurality of sets of vertically shifted pixel values, wherein the frequency number for the image accumulation procedure ranges from 3 to 20.

2. The method of claim 1, further comprising:
outputting the final greyscale image.

3. The method of claim 1, wherein the establishing the zero crossing region from the target image onto the screen comprises:
establishing, by a user, the zero crossing region from the target image onto the screen.

4. The method of claim 1, wherein the integration time is in seconds.

5. The method of claim 1, wherein the integration time ranges from approximately 0.1 to 60 seconds.

6. The method of claim 1, wherein the screen is a capacitive screen.

7. The method of claim 1, wherein the corresponding value comprises a pixel value of background noise level of the target image.

8. The method of claim 1, wherein the target image comprises at least one of: a luminescent image, a Raman signal image, a bio-luminescent image, a chem-luminescent image, or a fluorescent image.

9. The method of claim 1, wherein at least one of the variable input or the integration time input is user defined.

10. A non-transitory computer-readable medium encoded with a computer-readable program, which when executed by a processor, will cause the processor to execute an image processing method, the image processing method comprising:

establishing a zero crossing region from a target image onto a screen, wherein the zero crossing region comprises a corresponding value;

receiving a variable input and an integration time input, wherein the variable input comprises a frequency number for an image accumulation procedure;

performing the image accumulation procedure, wherein the image accumulation procedure comprises:

performing an accumulation of a plurality of incoming signals captured by the sensor within the integration time;

obtaining an RGB image from the accumulation of the plurality of incoming signals captured by the sensor within the integration time;

converting the RGB image into a greyscale image;

applying a circular averaging filter to the greyscale image;

performing a vertical translation using the corresponding value on the greyscale image, thereby producing a vertically translated greyscale image; and calculating a set of vertically shifted pixel values from the vertically translated greyscale image and the corresponding value; and producing a final greyscale image by adding a plurality of sets of vertically shifted pixel values, wherein the frequency number for the image accumulation procedure ranges from 3 to 20.

11. The method of claim 1, further comprising:
outputting the final greyscale image.

12. The method of claim 1, wherein the establishing the zero crossing region from the target image onto the screen comprises:
establishing, by a user, the zero crossing region from the target image onto the screen.

13. The method of claim 1, wherein the integration time is in seconds.

14. The method of claim 1, wherein the integration time ranges from approximately 0.1 to 60 seconds.

15. The method of claim 1, wherein the screen is a capacitive screen.

16. The method of claim 1, wherein the corresponding value comprises a pixel value of background noise level of the target image.

17. The method of claim 1, wherein the target image comprises at least one of: a luminescent image, a Raman signal image, a bio-luminescent image, a chem-luminescent image, or a fluorescent image.

18. The method of claim 1, wherein at least one of the variable input or the integration time input is user defined.

19. The method of claim 1, wherein the integration time comprises a time period for which an aperture for a sensor receives incoming signals.

20. A non-transitory computer-readable medium encoded with a computer-readable program, which when executed by a processor, will cause the processor to execute an image processing method, the image processing method comprising:

establishing a zero crossing region from a target image onto a screen, wherein the zero crossing region comprises a corresponding value;

receiving a variable input and an integration time input, wherein the variable input comprises a frequency number for an image accumulation procedure;

performing the image accumulation procedure, wherein the image accumulation procedure comprises:

performing an accumulation of a plurality of incoming signals captured by the sensor within the integration time;

obtaining an RGB image from the accumulation of the plurality of incoming signals captured by the sensor within the integration time;

converting the RGB image into a greyscale image;

applying a circular averaging filter to the greyscale image;

performing a vertical translation using the corresponding value on the greyscale image, thereby producing a vertically translated greyscale image; and calculating a set of vertically shifted pixel values from the vertically translated greyscale image and the corresponding value; and producing a final greyscale image by adding a plurality of sets of vertically shifted pixel values.

* * * * *